(12) United States Patent
Xu et al.

(10) Patent No.: US 10,112,276 B2
(45) Date of Patent: Oct. 30, 2018

(54) PRESS MECHANISM

(71) Applicants: FU DING ELECTRONICAL TECHNOLOGY (JIASHAN) CO.,LTD., Zhejiang (CN); HON HAI PRECISION INDUSTRY CO., LTD., New Taipei (TW)

(72) Inventors: Hua-Min Xu, Jiashan (CN); Shao-Mei Xue, Jiashan (CN); Hao Yang, Jiashan (CN)

(73) Assignees: FU DING ELECTRONICAL TECHNOLOGY (JIASHAN), Jiashan (CN); HON HAI PRECISION INDUSTRY CO., LTD., New Taipei (TW)

( * ) Notice: Subject to any disclaimer, the term of this patent is extended or adjusted under 35 U.S.C. 154(b) by 546 days.

(21) Appl. No.: 14/688,362

(22) Filed: Apr. 16, 2015

(65) Prior Publication Data
US 2016/0107280 A1    Apr. 21, 2016

(30) Foreign Application Priority Data

Oct. 15, 2014   (CN) .................... 2014 2 0595109 U

(51) Int. Cl.
*B21D 39/03*    (2006.01)
*B23Q 3/06*    (2006.01)
(Continued)

(52) U.S. Cl.
CPC ........... *B23Q 3/069* (2013.01); *B21D 39/031* (2013.01); *B21D 22/10* (2013.01); *B21D 37/04* (2013.01);
(Continued)

(58) Field of Classification Search
CPC ........ B21D 22/22; B21D 22/26; B21D 24/04; B21D 39/031; B21D 22/10; B21D 37/04;
(Continued)

(56) References Cited

U.S. PATENT DOCUMENTS 1,960,934 A * 5/1934 West .................... A23G 7/0031
269/265
3,037,473 A * 6/1962 Whistler, Sr. .......... B21D 37/10
72/328
(Continued)

OTHER PUBLICATIONS

Wilson HPX Guide Assemblies; published on Nov. 12, 2012 https://www.youtube.com/watch?time_continue=55&v=hHijrXnOVjc.*
SME Progresive Dies; Copyright 1990.*

*Primary Examiner* — Christopher M Koehler
*Assistant Examiner* — Mahdi H Nejad
(74) *Attorney, Agent, or Firm* — ScienBiziP, P.C.

(57) ABSTRACT

A press mechanism includes a driving mechanism, a connecting plate connected to the driving mechanism, an installation plate, and a press assembly. The press assembly includes a base defining at least one first resisting groove, at least one first press block and at least one second press block positioned on the base. The first press block includes at least one first elastic member and a first connecting block defining at least one second resisting groove. A predetermined distance is defined between the first connecting block and the base, and the first elastic member is received in the first resisting groove and the second resisting groove.

18 Claims, 6 Drawing Sheets

(51) Int. Cl.
  *B23Q 3/10* (2006.01)
  *B21D 22/10* (2006.01)
  *C21D 1/673* (2006.01)
  *B21D 37/04* (2006.01)

(52) U.S. Cl.
  CPC .............. *B23Q 3/103* (2013.01); *C21D 1/673* (2013.01); *Y10T 29/53709* (2015.01); *Y10T 29/53996* (2015.01)

(58) Field of Classification Search
  CPC ............... Y10T 29/53709; Y10T 29/53; Y10T 29/53996; Y10T 29/49915; Y10T 403/4966; B31B 50/0012; C21D 1/673; B23Q 3/069; B23Q 3/103
  USPC ......... 269/265; 72/350, 466.9, 57; 29/243.5, 29/432, 283.5, 509
  See application file for complete search history.

(56) References Cited

U.S. PATENT DOCUMENTS

| | | | | |
|---|---|---|---|---|
| 3,122,262 A * | 2/1964 | Hagmann | ............... | B21D 51/46 220/304 |
| 3,983,827 A * | 10/1976 | Meadors | ............... | B21D 51/383 264/293 |
| 3,993,010 A * | 11/1976 | Taniuchi | ............... | B65D 17/404 72/325 |
| 4,228,121 A * | 10/1980 | Meadors | ............... | B29C 51/082 264/291 |
| 4,794,687 A * | 1/1989 | Peters | .................... | B23Q 3/103 269/900 |
| 4,803,767 A * | 2/1989 | Obrecht | ............... | B21D 39/031 29/243.5 |
| 4,828,240 A * | 5/1989 | Longenecker | ......... | B23Q 3/103 269/100 |
| 4,905,362 A * | 3/1990 | Obrecht | ............... | B21D 39/031 29/21.1 |
| 5,026,033 A * | 6/1991 | Roxy | .................... | B23Q 3/103 269/309 |
| 5,064,321 A * | 11/1991 | Barnes | ................... | B23Q 3/103 269/303 |
| 5,208,974 A * | 5/1993 | Sawdon | ............... | B21D 39/031 29/243.5 |
| 5,315,743 A * | 5/1994 | Schleicher | ........... | B21D 39/031 29/243.5 |
| 5,519,934 A * | 5/1996 | Dobrikow | ............ | B21D 39/031 29/521 |
| 5,746,423 A * | 5/1998 | Arov | .................... | B25B 1/2421 269/257 |
| 6,092,270 A * | 7/2000 | Sawdon | ................ | B21D 39/031 29/243.5 |
| 6,532,665 B2 * | 3/2003 | Parker | ................... | B23P 11/005 29/283.5 |
| 6,616,586 B2 * | 9/2003 | Dai | .......................... | B27N 3/08 264/320 |
| 7,080,535 B2 * | 7/2006 | Kruger | ................ | B21D 26/055 29/421.1 |
| 7,481,093 B2 * | 1/2009 | Joseph | ................ | B21D 28/002 72/333 |
| 8,006,967 B2 * | 8/2011 | Sleijpen | ................. | G01M 3/26 269/153 |
| 8,047,834 B2 * | 11/2011 | Sofronie | .................. | B29C 43/36 264/334 |
| 8,756,797 B2 * | 6/2014 | Yu | ......................... | G01L 5/0038 29/407.08 |
| 9,522,823 B2 * | 12/2016 | Feng | .................... | B81C 1/00436 |
| 2002/0038504 A1 * | 4/2002 | Engler | ................ | B21D 39/031 29/521 |
| 2008/0098789 A1 * | 5/2008 | Hori | ....................... | B21D 22/02 72/349 |
| 2010/0018277 A1 * | 1/2010 | Hielscher | ............... | B21D 24/16 72/352 |
| 2010/0230884 A1 * | 9/2010 | Nelson | .................. | B25B 1/2405 269/265 |
| 2011/0258824 A1 * | 10/2011 | Dubugnon | ........... | B21D 39/031 29/283.5 |
| 2012/0124805 A1 * | 5/2012 | Dubugnon | ............. | B21D 39/03 29/428 |
| 2013/0056920 A1 * | 3/2013 | Watari | ................... | B23Q 3/066 269/58 |
| 2013/0207332 A1 * | 8/2013 | Li | ............................ | B23Q 1/25 269/73 |
| 2013/0334755 A1 * | 12/2013 | Wern | ....................... | B25B 5/06 269/254 CS |
| 2014/0183805 A1 * | 7/2014 | Beaty | ...................... | B23Q 3/08 269/25 |
| 2014/0246824 A1 * | 9/2014 | Fiegener | ............... | B25B 1/2478 269/265 |
| 2015/0123336 A1 * | 5/2015 | Chang | ...................... | B25B 5/02 269/268 |
| 2015/0235892 A1 * | 8/2015 | Gao | .................. | H01L 21/68728 29/559 |
| 2016/0016221 A1 * | 1/2016 | Dubugnon | ........... | B21D 39/031 29/243.5 |
| 2016/0176147 A1 * | 6/2016 | Vassa | ...................... | B31B 43/00 493/73 |
| 2017/0338615 A1 * | 11/2017 | Imgrut | ................... | B21D 37/04 |

* cited by examiner

PRESS MECHANISM

FIELD

The subject matter herein generally relates to a press mechanism for processing a work piece.

BACKGROUND

In mechanical manufacturing, a press mechanism is a significant tool which may directly affect a work piece quality. For example, in mould machining, the press mechanism is applied as an auxiliary tool, which is capable of exerting a pressure on the work piece and preventing the work piece from vibrating and shifting during the mould machining, improving machining accuracy of the work piece. A uniformity of the exerted pressure from the press mechanism is vital to the quality of the work piece.

BRIEF DESCRIPTION OF THE DRAWINGS

Implementations of the present technology will now be described, by way of example only, with reference to the attached figures.

DETAILED DESCRIPTION

Figure 1:
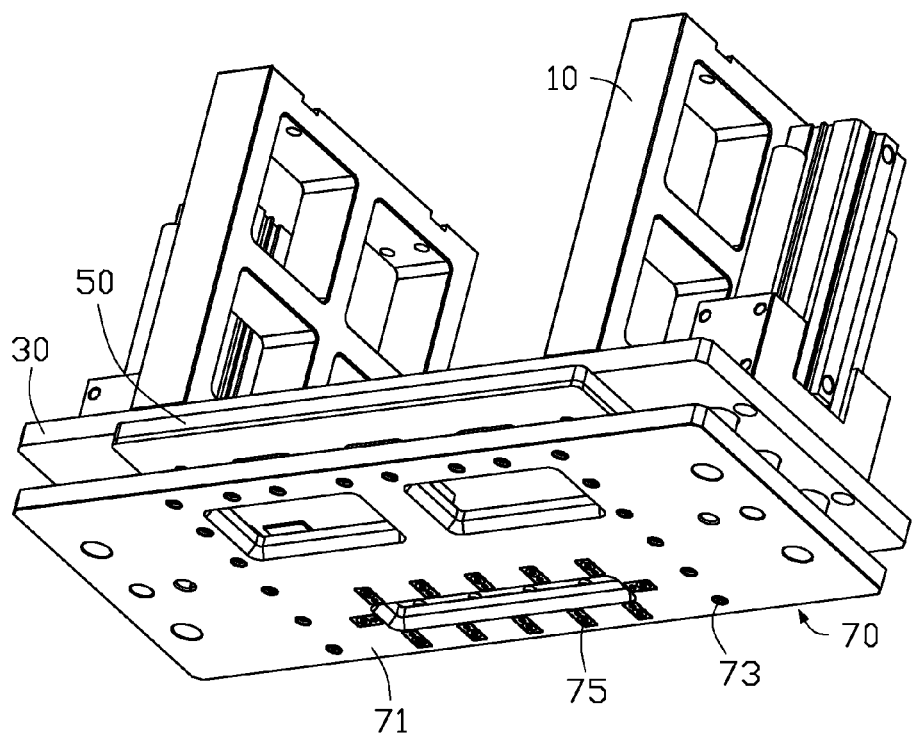
FIG. 1 is an isometric view of an embodiment of a press mechanism.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

The present disclosure is described in relation to a press mechanism.

Figure 2:
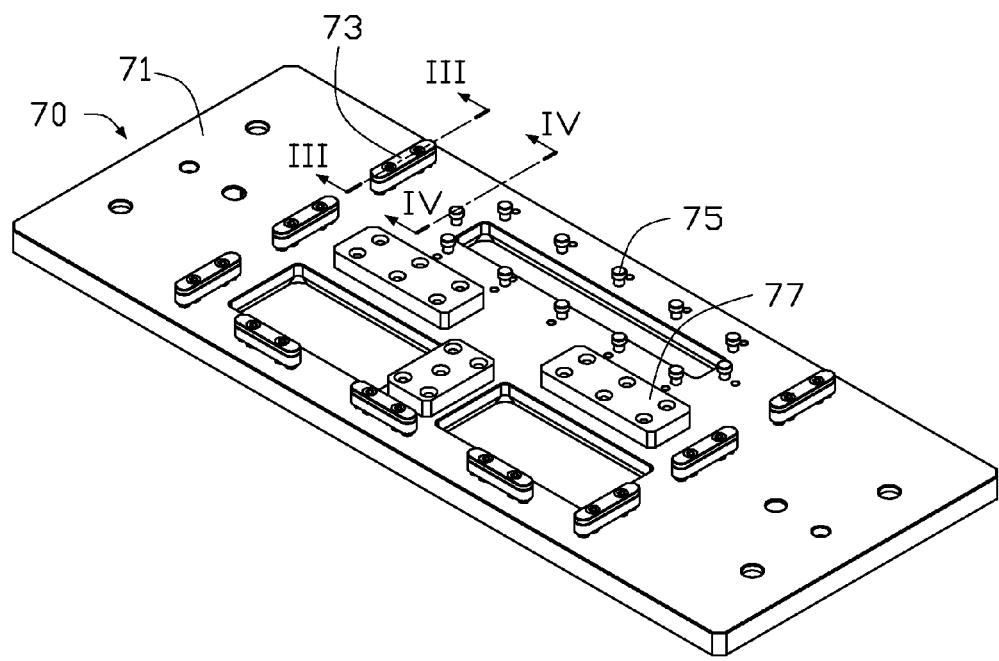
FIG. 2 is an isometric view of a press assembly of the press mechanism shown in FIG. 1.

FIGS. 1-2 illustrate that a press mechanism 100 can include a driving mechanism 10, a connecting plate 30 connected to the driving mechanism 10, an installation plate 50 adjacent to the connecting plate 30, and a press assembly 70 connected to the installation plate 50.

The driving mechanism 10 can be connected to a cylinder, a motor or the like. The driving mechanism 10 can be configured to drive the connecting plate 30, the installation plate 50 and the press assembly 70 to move. The installation plate 50 can be located between the connecting plate 30 and the press assembly 70. The connecting plate 30, the installation plate 50, and the press assembly 70 can be parallel with each other. When the driving mechanism 10 drives the connecting plate 30, the installation plate 50, and the press assembly 70 to a work piece waiting for processing, the press assembly 70 can be configured to touch and press the work piece.

The press assembly 70 can include a base 71, a plurality of first press blocks 73, a plurality of second press blocks 75, and a plurality of installation blocks 77. The first press block 73 and the second press block 75 can be arranged on the base 71 in an liner array pattern.

In other embodiments, the first press block 73 and the second press block 75 can be arranged on the base 71 in a circular array pattern, an oval array pattern, a polygonal array pattern or the like, which can be positioned corresponding to a shape and size of the work piece. One surface of the base 71 away from the driving mechanism 10 can be served as a touching surface configured to touch the work piece. The installation block 77 can be configured to connect the base 71 to the installation plate 50.

Figure 3:
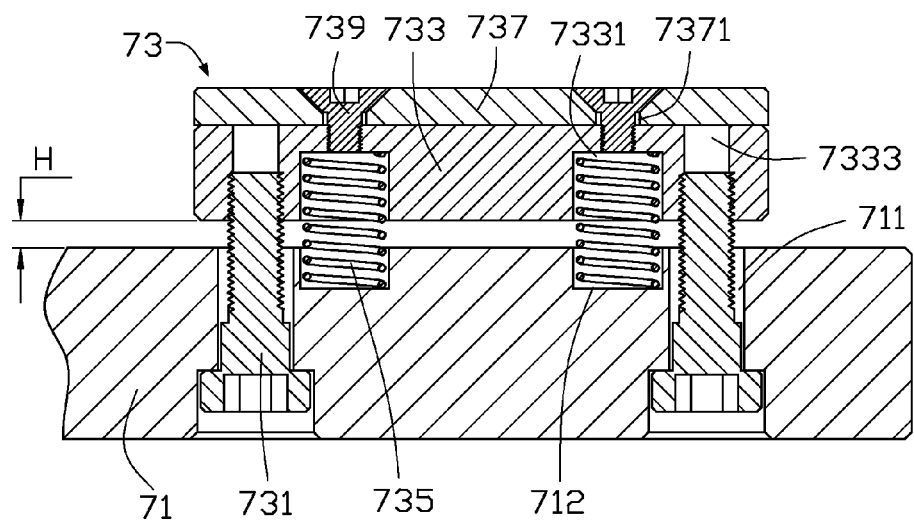
FIG. 3 is a cross-sectional view of a first press block shown in FIG. 2 taken along line III-III.

FIG. 3 illustrates that the base 71 can define a plurality of connecting holes 711 and a plurality of first resisting grooves 712. The connecting holes 711 and the first resisting grooves 712 can be positioned facing the first press block 73. The connecting hole 711 can be positioned adjacent to the first resisting groove 712. An axial direction of the connecting hole 711 can be parallel with the axial direction of the first resisting groove 712.

The first press block 73 can include a plurality of fastening pins 731, a first connecting block 733, a plurality of first elastic members 735, a second connecting block 737, and a plurality of fastening members 739. The number of the fastening pins 731, and the first elastic members 735 can be two. At least one the fastening pin 731, and first elastic member 735 is needed.

The fastening pin 731 can be partially received in connecting hole 711 of the base 71. The first elastic member 735 can be hollow and cylindrical. In one embodiment, the first elastic member 735 can be two. In other embodiments, the first elastic member 735 can be at least one. The first elastic member 735 can be abut against and located between the base 71 and the first connecting block 733. The fastening member 739 can be configured to connect the second connecting block 737 to the first connecting block 733. The first connecting block 733 can be positioned parallel with the base 71 and connected to the base 71 by the fastening pin 731. A predetermined distance H can be defined between the base 71 and the first connecting block 733.

Opposite ends of the fastening pin 731 can be received in the connecting hole 711 and the first connecting block 733, whereby the first connecting block 733 can be connected to the base 71.

The first connecting block 733 can define a plurality of second resisting grooves 7331 thereon facing the first resisting groove 712. The second resisting groove 7331 and the first resisting groove 712 can be configured to cooperatively receive the first elastic member 735. The first elastic member 735 can adjust the distance between the base 71 and the first connecting block 733. When the first elastic member 735 is compressed, the distance between the base 71 and the first connecting block 733 can be reduced. When the first elastic member 735 rebounds, the distance between the base 71 and the first connecting block 733 can increase. The distance between the base 71 and the first connecting block 733 can be adjusted from zero to the predetermined distance H.

The first connecting block 733 can further define a plurality of through holes 7333 facing the connecting holes 711. The through hole 7333 and the connecting hole 711 can be configured to cooperatively receive the fastening pin 731.

The second connecting block 737 can define a plurality of recess portions 7371 thereon facing the second resisting groove 7331. The shape and size of the recess portion 7371 can match the fastening member 739, whereby the fastening member 739 can connect the first connecting block 733 to the second connecting block 737.

Figure 4:
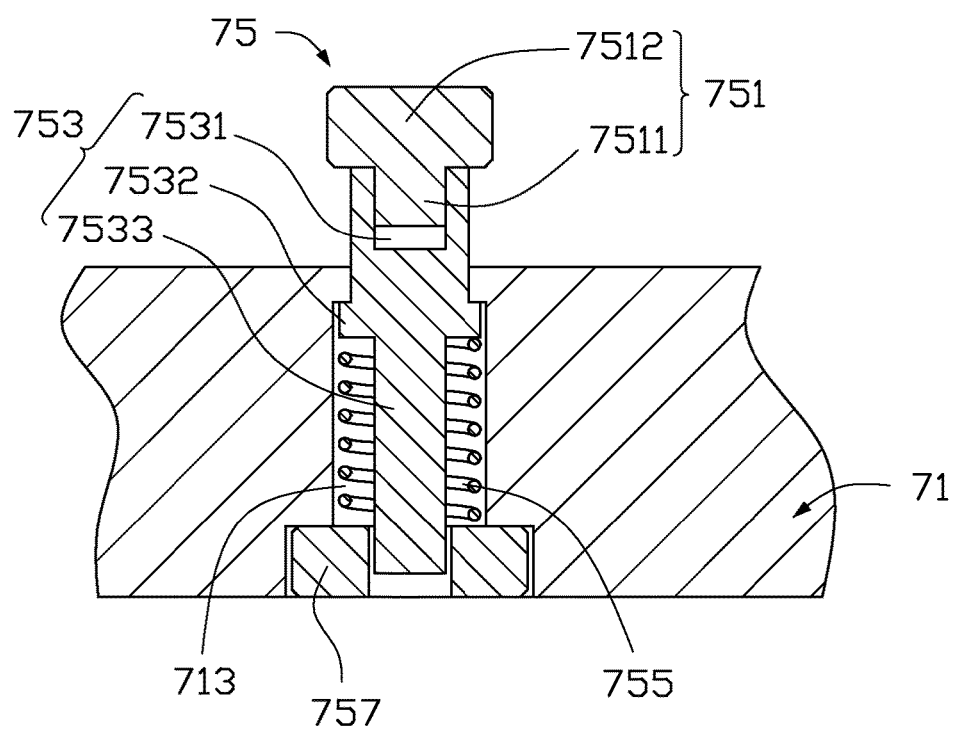
FIG. 4 is a cross-sectional view of a second press block shown in FIG. 2 taken along line IV-IV.

FIG. 4 illustrates that the base 71 can further include a plurality of first inserting holes 713 positioned facing the second press block 75. The second press block 75 can include a press bit 751, a movable pin 753, a second elastic member 755, and a connecting member 757 received in the base 71.

The movable pin 753 can be connected to the press bit 751 and can be partially received in the base 71. The second elastic member 755 can be coiled on the movable pin 753 and received in the first inserting holes 713 of the base 71. The connecting member 757 can be configured to restrict the movable pin 753 in the base 71. The movable pin 753 and the second elastic member 755 can be received in the first inserting hole 713.

The press bit 751 can be T-shaped and can include a protrusion 7511 inserted in the movable pin 753 and an end portion 7512 connected to the protrusion 7511.

The movable pin 753 can include a cup-shaped inserting portion 7531 connected to the protrusion 7511, a flange 7532 configured to resist against the second elastic member 755, and a rod portion 7533. A diameter of the flange 7532 can be larger than the rod portion 7533. The flange 7532 can be connected to and located between the inserting portion 7531 and the rod portion 7533. The inserting portion 7531 can be hollow and cylindrical. A shape and size of the inserting portion 7531 can match the protrusion 7511.

The second elastic member 755 can be a hollow, cylindrical spring. The second elastic member 755 can be coiled on the rod portion 7533 and can be received in the base 71. The second elastic member 755 can be located between and resisted abut the flange 7532 and the connecting member 757. The press bit 751 can press the movable pin 753 and the movable pin 753 can exert a press to the second elastic member 755 in an axial direction. The second elastic member 755 can be compressed to generate a deformation, whereby the movable pin 753 can be moved with the second elastic member 755 relative to the base 71.

Figure 5:
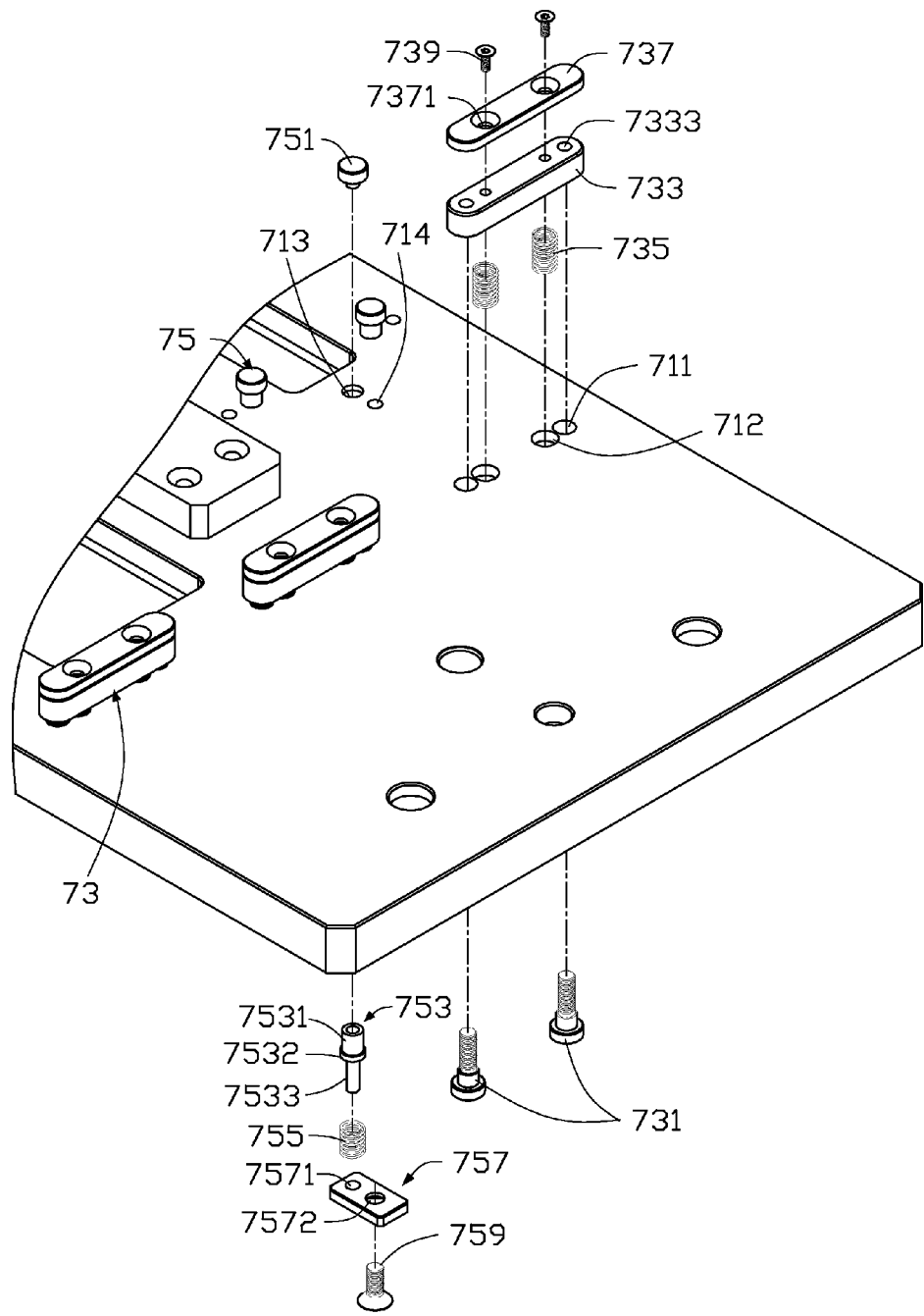
FIG. 5 is a partial, exploded view of the press assembly shown in FIG. 2.
Figure 6:
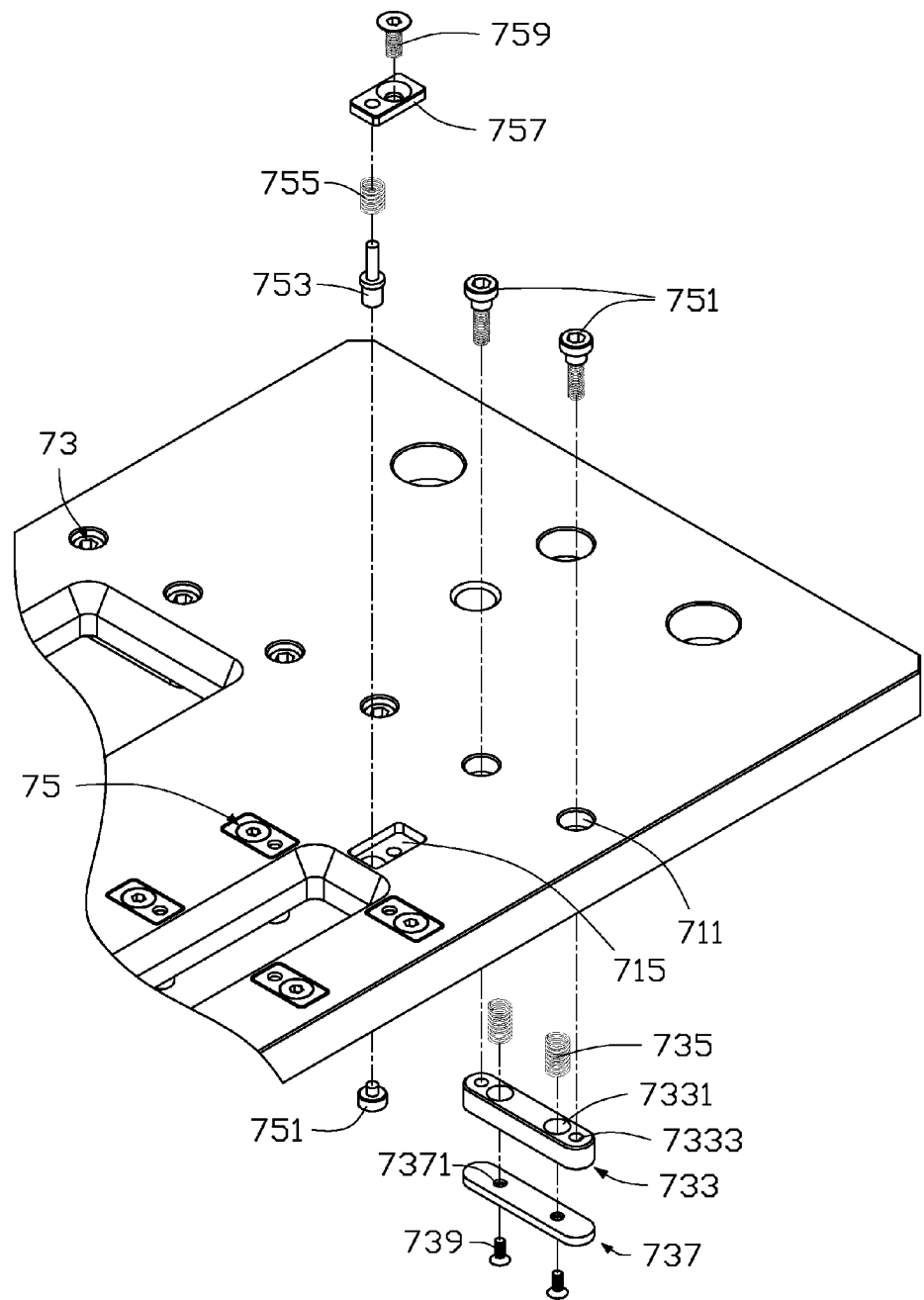
FIG. 6 is a partial, exploded view of the press assembly shown in FIG. 2 from another angle.

FIG. 5-6 illustrate that the base 71 can further include a first fastening hole 714 adjacent to the first inserting hole 713, and a rectangular recess 715 configured to receive the connecting member 757. The first inserting hole 713 and the first fastening hole 714 can be positioned on an side of the base 71 adjacent to the press bit 751. The recess 715 can be positioned on the side of the base 71 away from the press bit 751. The first inserting hole 713 and the first fastening hole 714 can be positioned facing the recess 715.

The shape and size of the connecting member 757 can match the recess 715. The connecting member 757 can define a second inserting hole 7571 facing the first inserting hole 713, and a second fastening hole 7572 facing the first fastening hole 714. The shape and size of the second inserting hole 7571 can match the rod portion 7533, and the rod portion 7533 can be moved in the second inserting hole 7571 with the second elastic member 755.

The second press block 75 can further include a fastening member 759 which can match the shape and size of the second fastening hole 7572. The fastening member 759 can be configured to fasten the connecting member 757. In one embodiment, the press mechanism 100 can include at least one of the first press block 73 and the second press block 75.

The embodiments shown and described above are only examples. Many details are often found in the art such as the other features of a press mechanism. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A press mechanism, comprising:
   a driving mechanism;
   a connecting plate connected to the driving mechanism;
   an installation plate adjacent to the connecting plate; and
   a press assembly connected to the installation plate, comprising:
      a base defining at least one first resisting groove thereon;
      at least one first press block positioned on the base, each first press block comprising:
         a first connecting block parallel with the base, which defines at least one second resisting groove thereon facing the at least one first resisting groove; wherein a predetermined distance is defined between the first connecting block and the base; and
         a first elastic member received in the at least one first resisting groove and the at least one second resisting groove and configured to be abutted against the base and the first connecting block, whereby the base is capable of being moved relative to the first connecting block by the first elastic member; and
      at least one second press block positioned on the base, each second press block comprising:
         a press bit comprising a protrusion and an end portion connected to the protrusion;
         a movable pin positioned in the base and connected to the press bit, the movable pin comprising an inserting portion, a flange, and a rod portion, the flange being connected to and located between the inserting portion and the rod portion;
         a second elastic member coiled on the rod portion and received in the base, and
         a connecting member received in the base and defining a second inserting hole configured to connect the rod portion;
      wherein the rod portion is movably inserted into the second inserting hole;
      wherein the installation plate is located between the connecting plate and the press assembly, and the press assembly is located at one side of the connecting plate away from the driving mechanism; and wherein the inserting portion is hollow and cylindrical, and the protrusion is inserted into the inserting portion.

2. The press mechanism as claimed in claim 1, wherein the base defines at least one first inserting hole configured to receive the rod portion and the second elastic member.

3. The press mechanism as claimed in claim 1, wherein the second elastic member is abutted against and located between the connecting member and the flange.

4. The press mechanism as claimed in claim 1, wherein each one of the at least one first press block further includes at least one fastening pin configured to connect the base and the first connecting block.

5. The press mechanism as claimed in claim 4, wherein the base defines at least one connecting hole, and the first connecting block defines at least one through hole facing the at least one connecting hole.

6. The press mechanism as claimed in claim 5, wherein opposite ends of the at least one fastening pin are received in the at least one connecting hole and the at least one through hole.

7. The press mechanism as claimed in claim 1, wherein each one of the at least one first press block further includes a second connecting block, and at least one fastening member configured to connect to the second connecting block to the first connecting block.

8. The press mechanism as claimed in claim 7, wherein the second connecting block defines at least one recess portion thereon facing the second resisting groove, and the at least one recess portion is capable of matching the at least one fastening member.

9. A press mechanism comprising:
a driving mechanism;
a connecting plate connected to the driving mechanism;
an installation plate adjacent to the connecting plate; and
a press assembly connected to the installation plate, comprising:
a base;
at least one second press block positioned on the base, each second press block comprising:
a press bit comprising a protrusion and an end portion connected to the protrusion;
a movable pin connected to the press bit and received in the base; the movable pin comprising an inserting portion, a flange, and a rod portion, the flange being connected to and located between the inserting portion and the rod portion;
a connecting member received in the base; and
a second elastic member coiled on the rod portion of the movable pin and received in the base, the second elastic member being abutted against the flange of the movable pin and the connecting member, whereby the movable pin is capable of moving relative to the base;
wherein the rod portion is movably inserted into the second inserting hole;
wherein the installation plate is located between the connecting plate and the press assembly, and the press assembly is located at one side of the connecting plate away from the driving mechanism; and
wherein the inserting portion is hollow and cylindrical, and the protrusion is inserted into the inserting portion.

10. The press mechanism as claimed in claim 9, wherein the press assembly further includes at least one first press block.

11. The press mechanism as claimed in claim 10, wherein each one of the first press block includes a first connecting block parallel with and connected to the base, and a first elastic member abutted against the first connecting block and the base.

12. The press mechanism as claimed in claim 11, wherein a predetermined distance is defined between the first connecting block and the base.

13. The press mechanism as claimed in claim 12, wherein the base defines at least one first resisting groove thereon and the first connecting block defines at least one second resisting groove thereon facing the at least one first resisting groove.

14. The press mechanism as claimed in claim 13, wherein the first elastic member is received in each one of the at least one first resisting groove and the at least one second resisting groove.

15. A press mechanism, comprising:
a driving mechanism;
a connecting plate connected to the driving mechanism;
an installation plate adjacent to the connecting plate; and
a press assembly connected to the installation plate, comprising:
a base defining a plurality of first inserting holes;
a plurality of second press blocks positioned on the base and arranged in an array, each second press block comprising:
a press bit comprising a protrusion and an end portion connected to the protrusion;
a movable pin positioned in the base and connected to the press bit, the movable pin comprising an inserting portion, a flange, and a rod portion, the flange being connected to and located between the inserting portion and the rod portion;
a second elastic member coiled on the rod portion and received in the first inserting hole, and
a connecting member received in the base and defining a second inserting hole configured to connect the rod portion;
wherein the rod portion is movably inserted into the second inserting hole;
wherein one side of the base away from the press bit defines a recess, and the connecting member is received in the recess; and
wherein the installation plate is located between the connecting plate and the press assembly, the connecting plate, the installation plate, and the base are parallel with each other, and the press assembly is located at one side of the connecting plate away from the driving mechanism.

16. The press mechanism as claimed in claim 15, wherein the second elastic member is abutted against and located between the connecting member and the flange.

17. The press mechanism as claimed in claim 15,
wherein the press assembly further comprises a plurality of first press blocks, each one of the first press block comprises a first connecting block parallel with and connected to the base, and a first elastic member abutted against the first connecting block and the base; and
wherein a predetermined distance is defined between the first connecting block and the base.

18. The press mechanism as claimed in claim 17, wherein the base defines at least one first resisting groove thereon and the first connecting block defines at least one second resisting groove thereon facing the at least one first resisting groove; and
wherein the first elastic member is received in each one of the at least one first resisting groove and the at least one second resisting groove.

\* \* \* \* \*

UNITED STATES PATENT AND TRADEMARK OFFICE
CERTIFICATE OF CORRECTION

PATENT NO.        : 10,112,276 B2
APPLICATION NO.   : 14/688362
DATED             : October 30, 2018
INVENTOR(S)       : Hua-Min Xu, Shao-Mei Xue and Hao Yang It is certified that error appears in the above-identified patent and that said Letters Patent is hereby corrected as shown below:

On the Title Page

Please replace item (73) regarding "Assignees" with the following:
(73) Assignees: FU DING ELECTRONICAL TECHNOLOGY (JIASHAN)
             CO., LTD., Jiashan (CN);
        HON HAI PRECISION INDUSTRY CO., LTD., New Taipei (TW)

Signed and Sealed this
Fifth Day of November, 2019

Andrei Iancu
*Director of the United States Patent and Trademark Office*